United States Patent
Han et al.

(10) Patent No.: US 8,526,994 B2
(45) Date of Patent: Sep. 3, 2013

(54) APPARATUS AND METHOD FOR CONTROLLING TRANSMIT POWER OF INDOOR BASE STATION IN A BROADBAND WIRELESS COMMUNICATION SYSTEM

(75) Inventors: Ki-Young Han, Yongin-si (KR); Byoung-Ha Yi, Seoul (KR); Won-Kyun Suk, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 13/044,208

(22) Filed: Mar. 9, 2011

(65) Prior Publication Data

US 2011/0230226 A1 Sep. 22, 2011

(30) Foreign Application Priority Data

Mar. 16, 2010 (KR) .................. 10-2010-0023488

(51) Int. Cl.
*H04B 7/24* (2006.01)

(52) U.S. Cl.
USPC ........ 455/522; 455/404.1; 455/436; 370/338; 370/352

(58) Field of Classification Search
USPC ....................................................... 455/522
See application file for complete search history.

(56) References Cited

U.S. PATENT DOCUMENTS

| | | | | |
|---|---|---|---|---|
| 5,437,055 A * | 7/1995 | Wheatley, III | ................. | 455/429 |
| 5,577,265 A * | 11/1996 | Wheatley, III | ................. | 370/335 |
| 5,794,129 A * | 8/1998 | Komatsu | ........................ | 455/69 |
| 6,169,907 B1 * | 1/2001 | Chang et al. | .................. | 455/522 |
| 6,185,432 B1 * | 2/2001 | Vembu | .......................... | 455/522 |
| 6,256,483 B1 * | 7/2001 | Moerder et al. | ........... | 455/115.1 |
| 6,259,928 B1 * | 7/2001 | Vembu | .......................... | 455/522 |
| 6,625,466 B1 * | 9/2003 | Dicker et al. | ................. | 455/522 |
| 6,704,579 B2 * | 3/2004 | Woodhead et al. | ........... | 455/522 |
| 6,879,829 B2 * | 4/2005 | Dutta et al. | ................... | 455/436 |
| 6,950,669 B2 * | 9/2005 | Simonsson | ................... | 455/522 |
| 7,162,262 B2 * | 1/2007 | Jonsson et al. | ................. | 455/522 |
| 7,187,664 B2 * | 3/2007 | Hiltunen | ....................... | 370/318 |
| 7,218,948 B2 * | 5/2007 | Laroia et al. | .................. | 455/522 |
| 7,257,101 B2 * | 8/2007 | Petrus et al. | .................. | 370/332 |
| 7,328,019 B2 * | 2/2008 | Nishikawa et al. | ........... | 455/436 |
| 7,418,263 B2 * | 8/2008 | Dutta et al. | ................... | 455/436 |
| 7,536,626 B2 * | 5/2009 | Sutivong et al. | .............. | 714/760 |
| 7,555,261 B2 * | 6/2009 | O'Neill | ......................... | 455/11.1 |
| 7,558,568 B2 * | 7/2009 | Karabinis | ..................... | 455/427 |
| 7,590,169 B2 * | 9/2009 | Gaal | ............................. | 375/220 |
| 7,613,171 B2 * | 11/2009 | Zehavi et al. | ................. | 370/352 |
| 7,657,276 B2 * | 2/2010 | Sakoda | .......................... | 455/522 |
| 7,697,474 B2 * | 4/2010 | Aoyama et al. | ............... | 370/328 |
| RE41,655 E * | 9/2010 | Woodhead et al. | ........... | 455/522 |
| RE41,936 E * | 11/2010 | Woodhead et al. | ........... | 455/522 |
| 7,835,384 B2 * | 11/2010 | Furuskar et al. | .............. | 370/445 |
| 7,881,659 B2 * | 2/2011 | Utakouji et al. | .............. | 455/11.1 |
| 8,014,264 B2 * | 9/2011 | Li et al. | ......................... | 370/203 |
| 8,229,491 B2 * | 7/2012 | Claussen et al. | .............. | 455/522 |

(Continued)

*Primary Examiner* — Hai V Nguyen

(57) ABSTRACT

A method and apparatus for controlling a Transmit power (TX power) of an indoor Base Station (BS) in a broadband wireless communication system. An operation of the indoor BS includes receiving received channel quality information on the indoor BS from at least one Mobile Station (MS), increasing in steps the TX power by as much as a basic unit amount and, determining whether an MS located outside a building has accessed the indoor BS using the received channel quality information in every increase and, when the MS located outside the building has accessed the indoor BS, decreasing the TX power of the indoor BS.

40 Claims, 10 Drawing Sheets

(56) References Cited

U.S. PATENT DOCUMENTS

| | | | |
|---|---|---|---|
| 8,265,637 B2* | 9/2012 | Karabinis | 455/446 |
| 8,315,217 B2* | 11/2012 | Montojo et al. | 370/329 |
| 8,363,592 B2* | 1/2013 | Laroia et al. | 370/326 |
| 8,385,967 B2* | 2/2013 | Hoole | 455/522 |
| 2002/0037705 A1* | 3/2002 | Moerder et al. | 455/115 |
| 2002/0119797 A1* | 8/2002 | Woodhead et al. | 455/522 |
| 2004/0156343 A1* | 8/2004 | Roy et al. | 370/336 |
| 2004/0166886 A1* | 8/2004 | Laroia et al. | 455/522 |
| 2004/0166887 A1* | 8/2004 | Laroia et al. | 455/522 |
| 2004/0176027 A1* | 9/2004 | O'Neill | 455/7 |
| 2004/0229616 A1* | 11/2004 | Dutta et al. | 455/436 |
| 2005/0026606 A1* | 2/2005 | Karabinis | 455/422.1 |
| 2005/0078047 A1* | 4/2005 | Chiang et al. | 343/853 |
| 2005/0170834 A1* | 8/2005 | Dutta et al. | 455/436 |
| 2005/0283687 A1* | 12/2005 | Sutivong et al. | 714/712 |
| 2006/0045069 A1* | 3/2006 | Zehavi et al. | 370/352 |
| 2006/0176857 A1* | 8/2006 | Utakouji et al. | 370/334 |
| 2006/0178106 A1* | 8/2006 | Utakouji et al. | 455/11.1 |
| 2006/0178162 A1* | 8/2006 | Utakouji et al. | 455/522 |
| 2006/0227857 A1* | 10/2006 | Gaal | 375/150 |
| 2007/0213087 A1* | 9/2007 | Laroia et al. | 455/522 |
| 2007/0243829 A1* | 10/2007 | Nagato et al. | 455/67.11 |
| 2009/0075645 A1* | 3/2009 | Karabinis | 455/422.1 |
| 2009/0186622 A1* | 7/2009 | Karabinis | 455/446 |
| 2009/0270027 A1* | 10/2009 | O'Neill | 455/15 |
| 2010/0015981 A1* | 1/2010 | Shimazaki et al. | 455/436 |
| 2010/0124930 A1* | 5/2010 | Andrews et al. | 455/436 |
| 2010/0142421 A1* | 6/2010 | Schlicht et al. | 370/310 |
| 2010/0216485 A1* | 8/2010 | Hoole | 455/452.2 |
| 2010/0227563 A1* | 9/2010 | Nibe | 455/65 |
| 2010/0240302 A1* | 9/2010 | Buczkiewicz et al. | 455/11.1 |
| 2010/0248735 A1* | 9/2010 | Hamabe et al. | 455/452.2 |
| 2010/0278281 A1* | 11/2010 | Hara et al. | 375/295 |
| 2011/0003557 A1* | 1/2011 | Morita et al. | 455/67.11 |
| 2011/0003559 A1* | 1/2011 | Morita et al. | 455/67.14 |
| 2011/0044231 A1* | 2/2011 | Shahar | 370/312 |
| 2011/0199945 A1* | 8/2011 | Chang et al. | 370/281 |
| 2011/0199990 A1* | 8/2011 | Chang et al. | 370/329 |
| 2011/0217947 A1* | 9/2011 | Czaja et al. | 455/404.1 |
| 2013/0072123 A1* | 3/2013 | Garavaglia et al. | 455/63.1 |

* cited by examiner

APPARATUS AND METHOD FOR CONTROLLING TRANSMIT POWER OF INDOOR BASE STATION IN A BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Mar. 16, 2010 and assigned Serial No. 10-2010-0023488, the entire disclosure of which is hereby incorporated by reference.

TECHNICAL FIELD OF THE INVENTION

The present invention relates to a broadband wireless communication system. More particularly, the present invention relates to an apparatus and method for controlling the Transmit power (TX power) of an indoor Base Station (BS) in a broadband wireless communication system.

BACKGROUND OF THE INVENTION

In a cellular broadband wireless communication system, each of a plurality of BSs performs communication through a wireless channel with a Mobile Station (MS) located in its own coverage. Typically, a state of the wireless channel varies depending on the movement of the MS. When the MS is located in a physically sealed area, for example, in a propagation shadow area such as an office or a house, a channel between the BS and the MS is greatly deteriorated and hence, smooth communication cannot be carried out. Hence, as one alternative for solving this, a scheme for installing an indoor BS acting as BS in a small indoor shadow area such as an office or a house is being considered.

The use of the indoor BS provides an advantage of being capable of providing service in a shadow area, but there is a concern that interference with a macro BS will be generated because the indoor BS is installed within the coverage of the macro BS. Hence, in using the indoor BS, the control of the Transmit power (TX power) of the indoor BS should follow the two conditions below:

First, the amount of a signal leaking out a building should be minimized so as to minimize interference; and Second, capacity in guaranteed indoor coverage should be maximized.

The less the TX power is, the easier the first condition is met. The more the TX power is, the easier the second condition is met. That is, the above two conditions are in conflict with each other. Therefore, an alternative for maximizing the efficiency of an indoor BS by meeting the above two conditions should be presented.

SUMMARY OF THE INVENTION

To address the above-discussed deficiencies of the prior art, it is a primary aspect of the present invention to provide an apparatus and method for optimizing the Transmit power (TX power) of an indoor Base Station (BS) in a broadband wireless communication system.

Another aspect of the present invention is to provide an apparatus and method for minimizing interference of a transmit signal of an indoor BS exerted on the outside of a building in a broadband wireless communication system.

A further aspect of the present invention is to provide an apparatus and method for maximizing a capacity within the coverage of an indoor BS in a broadband wireless communication system.

Yet another aspect of the present invention is to provide an apparatus and method for suitably distributing a load between a plurality of indoor BSs in a broadband wireless communication system.

The above aspects are achieved by providing an apparatus and method for controlling the TX power of an indoor BS in a broadband wireless communication system.

According to one aspect of the present invention, a method for determining the TX power of an indoor BS in a broadband wireless communication system is provided. The method includes receiving received channel quality information associated with the indoor BS from at least one Mobile Station (MS), increasing in steps the TX power by as much as a basic unit amount and, determining whether an MS located outside a building has accessed the indoor BS using the received channel quality information in every increase and, whether the MS located outside the building has accessed the indoor BS, decreasing the TX power of the indoor BS.

According to another aspect of the present invention, an operation method of a server managing an indoor BS in a broadband wireless communication system is provided. The method includes, when a TX power increase, decrease or maintenance request is received from the indoor BS, determining a permission or non-permission for the TX power increase, decrease or maintenance request in consideration of an average load of at least one indoor BS installed within a building where the indoor BS is located. The method also includes instructing the indoor BS about a TX power increase, decrease or maintenance.

According to a further aspect of the present invention, an apparatus for determining the TX power of an indoor BS in a broadband wireless communication system is provided. The apparatus includes a modem and a controller. The modem is configured to receive received channel quality information associated with the indoor BS from at least one MS. The controller is configured to increase in steps the TX power by as much as a basic unit amount and, determine whether an MS located outside a building has accessed the indoor BS using the received channel quality information in every increase and, when the MS located outside the building has accessed the indoor BS, decrease the TX power of the indoor BS.

According to yet another aspect of the present invention, a server apparatus for managing an indoor BS in a broadband wireless communication system is provided. The apparatus includes a manager and a controller. The manager is configured to store load information on at least one indoor BS. When a TX power increase, decrease or maintenance request is received from the indoor BS, the controller is configured to determine the permission or non-permission for the TX power increase, decrease or maintenance request in consideration of an average load of at least one indoor BS installed within a building where the indoor BS is located, and instruct the indoor BS about a TX power increase, decrease or maintenance.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Exemplary embodiments of the present invention provide a technology for optimizing the Transmit power (TX power) of an indoor Base Station (BS) in a broadband wireless communication system. The following description uses a Carrier to Interference and Noise Ratio (CINR) as a parameter representing a channel quality, but can use parameters representing other channel qualities such as a Signal to Interference and Noise Ratio (SINR), a Signal to Noise Ratio (SNR), and the like, in addition to the CINR.

Figure 1:
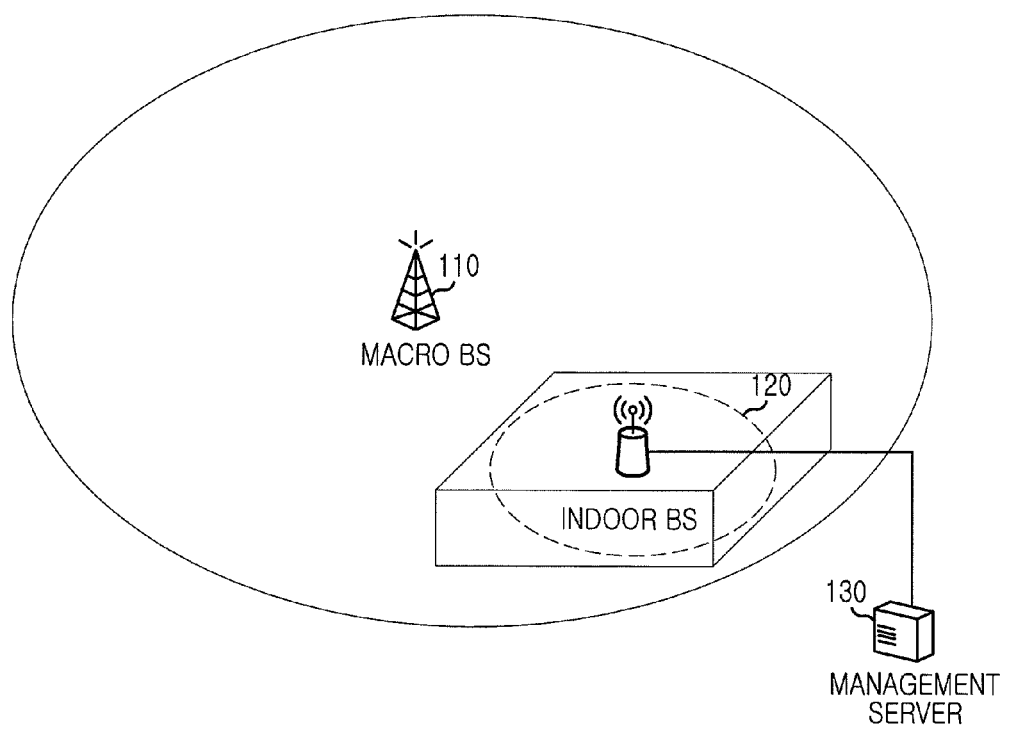
FIG. 1 illustrates a schematic construction of a broadband wireless communication system according to an embodiment of the present invention.

FIG. 1 illustrates a schematic construction of a broadband wireless communication system according to an embodiment of the present invention.

As illustrated in FIG. 1, an indoor Base Station (BS) 120 is located in a shadow area within a cell of a macro BS 110, e.g., inside a building. The indoor BS 120 is controlled by a management server 130, and includes service coverage for Mobile Stations (MSs) located inside the building. The management server 130 can be denoted as a Self Organization Network (SON) server. In FIG. 1, only one macro BS and one indoor BS are illustrated, but a plurality of indoor BSs can be located in a plurality of shadow areas or a plurality of indoor BSs can be located in one shadow area. Also, interference from the indoor BS 120 can affect external BSs, i.e., the macro BS 110 and other indoor BSs located outside the building.

For MSs located inside a building to select the indoor BS 120 as a serving BS, a received CINR within the building for the indoor BS 120 should be the same as at least a received CINR within the building for the macro BS 110. Accordingly, the indoor BS 120 sets a CINR target value to a CINR for the MSs located inside the building to select the indoor BS 120 as a serving BS, and controls a TX power such that an average received CINR of the MSs reaches the CINR target value. By this, the indoor BS 120 ensures its coverage within the building.

Also, the indoor BS 120 ensuring the coverage increases the TX power in steps for the sake of capacity increment, but maximizes the TX power within a range of exerting no interference on an MS located outside the building. By this, the indoor BS 120 maximizes service capacity at the same time of ensuring the coverage.

The above process of controlling the TX power of the indoor BS is mainly classified into 1) coverage ensuring procedure, 2) external interference restriction procedure, and 3) load balancing procedure. Each procedure and its technological basis is described using Equations below.

1) Coverage Ensuring Procedure

Assumed is that a Receive power (RX power) from an external BS is uniform, and a path loss dependent on distance is the same in all directions in a building where an indoor BS is located. Based on this assumption, a received CINR encountered by an MS within the coverage of the indoor BS can be expressed by Equation 1 below. For modeling of Equation 1 below, applied was an indoor path loss model of Equation 2 below.

$$E[CINR(r)(\text{dB})] = CINR_{MaxIndex}(\text{dB}) + \frac{A_{indoor}}{2 \cdot \ln(10)} \quad [\text{Eqn. 1}]$$

In Equation 1, the '$E[CINR(r)(\text{dB})]$' represents an average received CINR on decibel (dB) scale encountered by MSs within the coverage of an indoor BS, the '$CINR_{MaxIndex}(\text{dB})$' represents a received CINR on dB scale of an indoor BS for an external BS having a maximum RX power as the Over The Air Receiver (OTAR) scan result, and the '$A_{indoor}$' represents an attenuation coefficient of a path loss model.

An indoor path loss model used for modeling a received CINR encountered by an MS within the coverage of an indoor BS is given in Equation 2 below.

$$PL = A_{indoor} \cdot \log(d) + B_{indoor} \quad \text{[Eqn. 2]}$$

In Equation 2, the 'PL' represents a path loss, the '$A_{indoor}$' represents an attenuation coefficient, the 'd' represents a distance of a signal path, and the '$B_{indoor}$' represents a minimum coupling loss.

An average received CINR within the coverage of an indoor BS is maintained as a constant value irrespective of the size of the coverage. Hence, if the coverage of the indoor BS gets wide in steps, the average received CINR increases when the coverage goes over a building wall. This is because a signal received from an external BS is added.

The coverage of the indoor BS is limited to a point of sameness of a received CINR for the indoor BS and a received CINR for an external BS at a boundary of the coverage. But, the limit of the coverage of the indoor BS gets narrower than the point of sameness of the received CINRs, when the received CINR for the external BS at the point of sameness of the received CINRs is less than a CINR inducing a call drop. That is, a point of measuring of the CINR inducing the call drop is the boundary of the coverage. Accordingly, a target value of a CINR is determined according to Equation 3 below.

$$CINR_{coverage} = \max(CINR_{drop}, CINR_{MaxIndex}(\text{dB})) + \frac{A_{indoor}}{2 \cdot \ln(10)} \quad \text{[Eqn. 3]}$$

In Equation 3, the '$CINR_{coverage}$' represents a target value of a CINR, the '$CINR_{drop}$' represents a CINR inducing a call drop, the '$CINR_{MaxIndex}(\text{dB})$' represents a received CINR on dB scale of an indoor BS for an external BS having a maximum RX power as the OTAR scan result, and the '$A_{indoor}$' represents an attenuation coefficient of a path loss model.

For the sake of an operation of Equation 3 above, an indoor BS can determine a value of each factor of Equation 3 above by performing an OTAR scan. After determining the target value, the indoor BS determines received CINRs encountered by MSs within current coverage. For this, the indoor BS determines a shadowing factor. The shadowing signifies a phenomenon in which a signal is attenuated due to the geographical affection of a propagation space. For example, the shadowing factor is determined according to Equation 4 below.

$$SF_k(\text{dB}) = RxP_{MaxIndex,k}(\text{dB}) - E[RxP_{MaxIndex,m}(\text{dB})] \quad \text{[Eqn. 4]}$$

In Equation 4, the '$SF_k$' represents a shadowing factor of an indoor BS (k), the '$RxP_{MaxIndex,k}(\text{dB})$' represents a RX power on dB scale of the indoor BS (k) for an external BS having a maximum RX power as the OTAR scan result of the indoor BS (k), and the '$E[RxP_{MaxIndex,m}(\text{dB})]$' represents an average RX power on dB scale of MSs for the external BS having the maximum RX power as the OTAR scan result.

For the sake of an operation of Equation 4 above, the indoor BS can determine the RX power (=$RxP_{MaxIndex,k}(\text{dB})$) of the indoor BS (k) by performing OTAR scan, and can determine the average RX power (=$E[RxP_{MaxIndex,m}(\text{dB})]$) of the MSs through information reported from the MSs. In a description of Equation 4 above, the shadowing factor is determined by subtracting the average RX power from the external BS measured by the MSs, from the RX power from the external BS measured by the indoor BS. That is, in measuring the RX power from the external BS, differences between a propagation path of a signal of the indoor BS used for the measurement and propagation paths of signals of the MSs used for the measurement are propagation paths between the indoor BS and the MSs. Since signal attenuation in the propagation paths between the indoor BS and the MSs is the shadowing, a RX power difference at both sides of each of the propagation paths between the indoor BS and the MSs represents the amount of the shadowing. Accordingly, the shadowing factor is determined according to Equation 4 above.

If compensating shadowing using the shadowing factor, an average received CINR of MSs for an indoor BS is determined according to Equation 5 below.

$$E[CINR_m(\text{dB})] = E[RxP_{km}(\text{dB})] - 10 \cdot \log\left(N + \sum_{i=1}^{I} RxP_{ik} / SF_k\right) \quad \text{[Eqn. 5]}$$

In Equation 5, the '$E[CINR_m(\text{dB})]$' represents an average received CINR on dB scale for an indoor BS encountered by MSs within the coverage of the indoor BS, the '$E[RxP_{km}(\text{dB})]$' represents an average RX power on dB scale from the indoor BS to the MSs, the '$RxP_{ik}$' represents a RX power from an external BS (i) to an indoor BS (k), and the '$SF_k$' represents a shadowing factor of the indoor BS (k).

In a description of Equation 5 above, the average RX power from the indoor BS to the MSs located within the coverage of the indoor BS denotes a signal strength. The sum of a noise power and values dividing RX power from external BSs to the indoor BS by the shadowing factor denotes an interference and noise level. Thus, according to Equation 5 above, the indoor BS determines the average received CINR for the indoor BS encountered by the MSs, using the RX power for the indoor BS reported from the MSs, its own measured RX power from the external BSs, and the shadowing factor.

Accordingly, if the average received CINR is less than the CINR target value, the indoor BS increases the TX power. If the average received CINR is greater than the CINR target value, the indoor BS decreases the TX power. By this, the indoor BS ensures that its coverage meets the CINR target value. The TX power increase or decrease is accomplished by way of the determination of the indoor BS and the permission of the management server. The amount of an increase or decrease of one time is a basic unit amount of the TX power increase/decrease. That is, the TX power increase or decrease can be carried out at least one time or more.

Figure 2A:
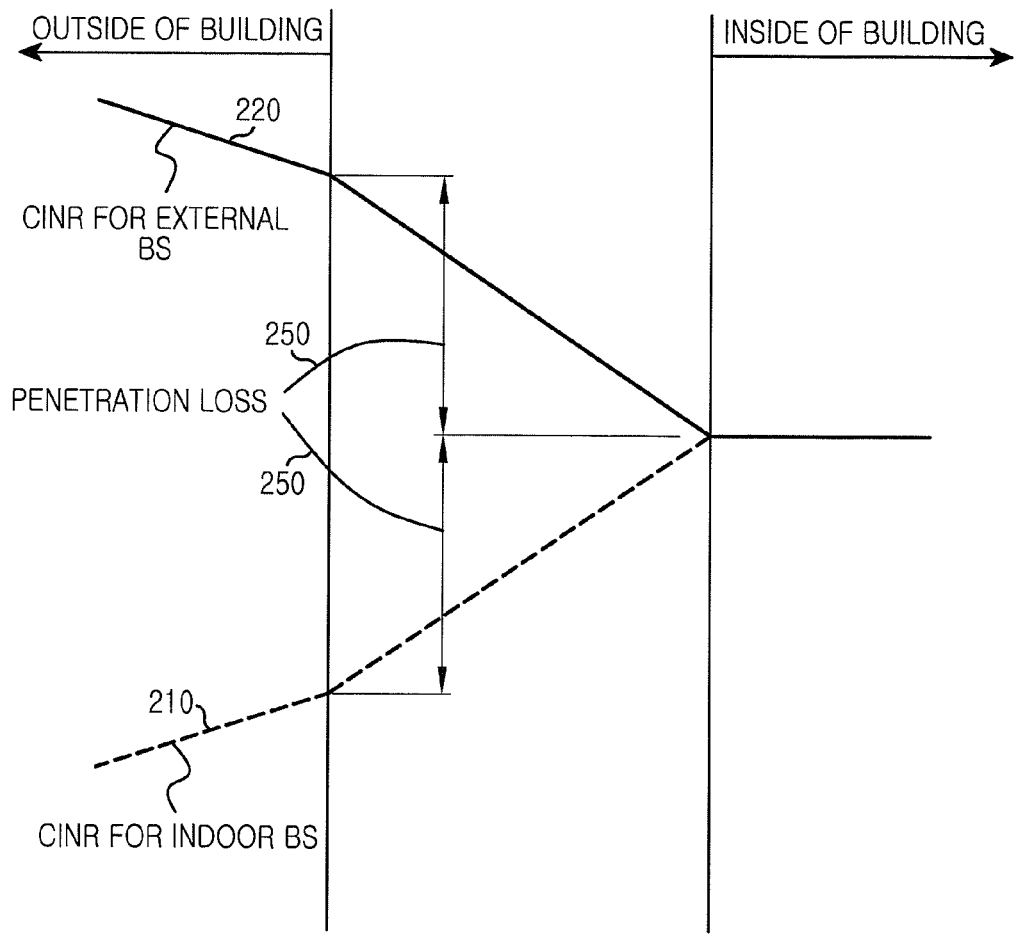
FIGS. 2A and 2B illustrate a Carrier to Interference and Noise Ratio (CINR) relationship between an indoor Base Station (BS) and an external BS in a broadband wireless communication system according to an embodiment of the present invention.

If the average received CINR is made equal to the CINR target value as above, a received CINR for an external BS and a received CINR for an indoor BS have the relationship of FIG. 2A. In FIG. 2A, a dotted line denotes a received CINR 210 for an indoor BS, and a solid line denotes a received CINR 220 for an external BS. From FIG. 2A, it can be appreciated that, at an inner wall of a building, the received CINR 210 for the indoor BS is the same as the received CINR 220 for the external BS. In this situation, the coverage of the indoor BS is defined to the inner wall of the building. At an outer wall of the building, a difference between the received CINR 210 for the indoor BS and the received CINR 220 for the external BS is twice a penetration loss 250. Here, the penetration loss 250 means the attenuation of a signal resulting from passing through a building wall. So, the CINR 210 for the indoor BS does not exceed the CINR 220 for the external BS in the outside of the building, when the CINR 210 for the indoor BS at the outer wall of the building is increased as much as the size of twice or less of the penetration loss 250.

That is, the coverage of the indoor BS is not expanded to the outside of the building. Thus, in order to improve the received CINR 210 for the indoor BS located inside the building, the TX power of the indoor BS is controlled according to the 2) external interference restriction procedure as follows.

2) External Interference Restriction Procedure

After ensuring that the coverage meets the CINR target value through the above procedure, the indoor BS controls the TX power to increase a capacity within its coverage and minimize interference exerted on the external. For the sake of this, the indoor BS sets a critical TX power that is a minimum power value exerting interference on the outside of the building and, through this, increases the TX power as much as a basic unit amount. For example, the TX power increase for the capacity increment is carried out by Equation 6 below.

$$TxP_k(dB) = \min(TxP_k(dB) + \text{PowerStep}, \text{Max}TxP_k(dB)) \quad \text{[Eqn. 6]}$$

In Equation 6, the '$TxP_k(dB)$' represents a TX power on dB scale of an indoor BS (k), the 'PowerStep' represents a basic unit amount of a TX power increase/decrease, and the 'Max$TxP_k(dB)$' represents a critical TX power of the indoor BS (k).

Here, the critical TX power may be determined using information obtained from a TX power control process according to an embodiment of the present invention. For example, the critical TX power can be set to the TX power of the indoor BS at a time an MS located outside a building has accessed the indoor BS. However, when initializing the critical TX power before performing the TX power control, the critical TX power can be initialized to the maximum TX power that the indoor BS can physically output.

Figure 2B:
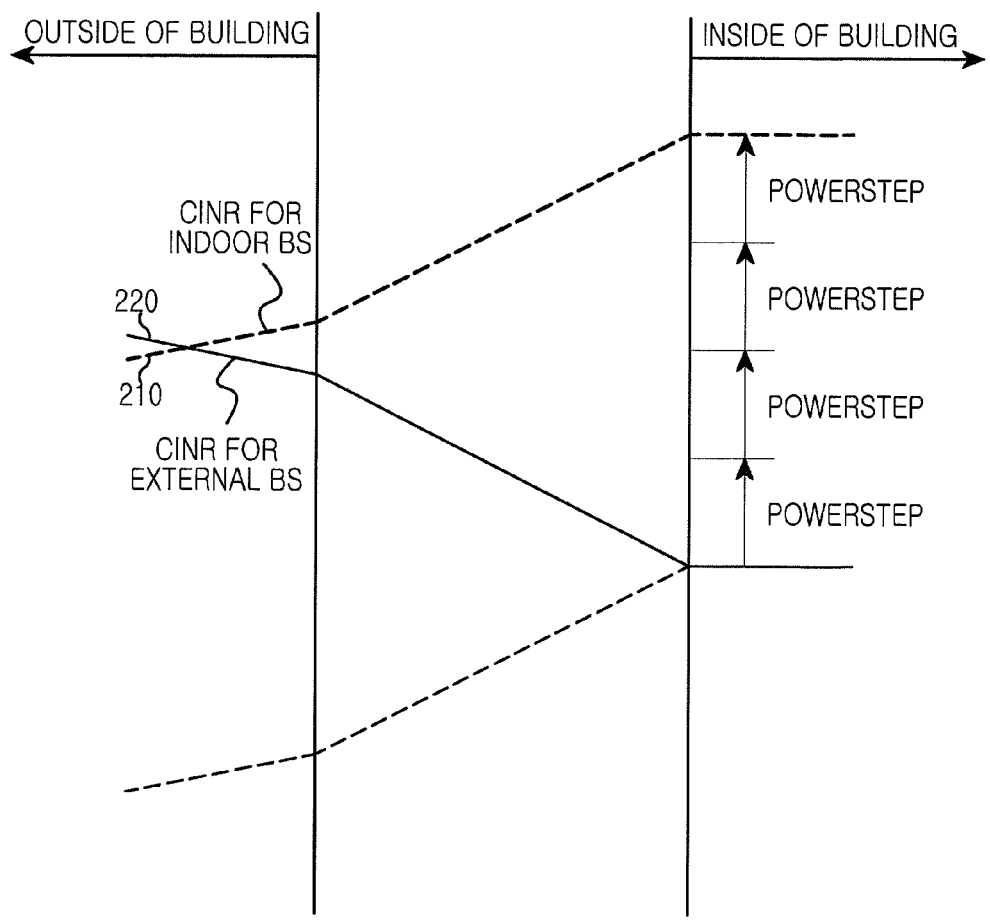

If the TX power increases in steps as above, in the end, as illustrated in FIG. 2B, a transmit signal of the indoor BS exerts interference on the outside of the building. Referring to FIG. 2B, as a TX power for the indoor BS increases, a received CINR 210 for the indoor BS increases in steps. As the result of the several TX power increases, at an outer wall of the building, the received CINR 210 for the indoor BS exceeded a received CINR 220 for an external BS. So, the indoor BS determines whether its interference in the outside of the building is generated every TX power increase. The generation or non-generation of the interference is determined depending on whether an MS located outside the building has accessed the indoor BS. For this, the indoor BS sets the size of a penetration loss, and compares a RX power of a newly accessing user with current average RX power of MSs. For example, whether the MS located outside the building has accessed the indoor BS is determined by Equation 7 below.

$$E[RxP_{MaxIndex,m}(dB)] + PLF \leq RxP_{MaxIndex,n}(dB) \quad \text{[Eqn. 7]}$$

In Equation 7, the '$E[RxP_{MaxIndex,m}(dB)]$' represents an average RX power of MSs for an external BS having a maximum RX power as the OTAR scan result, the 'PLF' represents a penetration loss, and the '$RxP_{MaxIndex,n}(dB)$' represents a RX power of an object MS for the external BS having the maximum RX power as the OTAR scan result.

The indoor BS selects the object MS, substitutes the RX power from the external BS reported by the object MS into Equation 7 above and then, if Equation 7 above is met, determines that it is in a state in which the object MS has accessed in the outside of a building. That is, if the RX power from the external BS reported by the object MS is greater than or equal to the sum of the average RX power from the external BS reported by the MSs and the penetration loss, the indoor BS determines that it is in the state where the object MS has accessed in the outside of the building. Accordingly, the indoor BS decreases a TX power.

A range of selecting the object MS is determined by Equation 8 below.

$$CINR_n(dB) \leq CINR_{drop} + 2 \cdot PLF \quad \text{[Eqn. 8]}$$

In Equation 8, the '$CINR_n(dB)$' represents a received CINR on dB scale of an object MS for an indoor BS, the '$CINR_{drop}$' represents a CINR inducing a call drop, and the 'PLF' represents a penetration loss.

A criterion of Equation 8 above is for excluding MSs neighboring on the indoor BS. That is, since the MSs neighboring on the indoor BS go through a high received CINR, a received CINR range of the object MS may be greater than a minimum value associated with the access, but less than a constant criterion value. In Equation 8 above, the CINR inducing the call drop is used as the minimum value associated with the access, and the sum of twice the penetration loss and the CINR inducing the call drop is used as the criterion value.

If the comparison result of Equation 7 above is that an MS accessing in the outside of a building exists, the indoor BS decreases a TX power. The decrease amount of the TX power is determined by Equation 9 below.

$$\text{PowerDropStep} = \min(2 \cdot PLF, E[CINR_m(dB)] - CINR_{coverage}) \quad \text{[Eqn. 9]}$$

In Equation 9, the 'PowerDropStep' represents the decrease amount of a TX power, the 'PLF' represents a penetration loss, the '$E[CINR_n(dB)]$' represents an average received CINR on dB scale for an indoor BS encountered by MSs within the coverage of the indoor BS, and the '$CINR_{coverage}$' represents a target value of a CINR.

In a description of Equation 9 above, the decrease amount of the TX power is less than or equal to a value of twice the penetration loss. That an MS has accessed an indoor BS in the outside of a building means that, in the outside of the building, a RX power from the indoor BS is greater than or equal to a RX power from an external BS. In the inside of the building, the RX power from the indoor BS is greater than the RX power from the external BS as much as a value of twice or more of the penetration loss. Thus, according to Equation 9 above, the decrease amount is determined as the smaller of the value of twice the penetration loss and a difference between a current average received CINR of the MSs and the CINR target value.

Accordingly, the TX power of the indoor BS decreases according to Equation 10 below. Also, a critical TX power used at the time of increasing the TX power of the indoor BS can be updated by Equation 11 below.

$$TxP_k(dB) = \max(TxP_k(dB) - \text{PowerDropStep}_k, TxP_{min}(dB)) \quad \text{[Eqn. 10]}$$

In Equation 10, the '$TxP_k(dB)$' represents a TX power on dB scale of an indoor BS (k), the 'PowerDropStep' represents a TX power decrease amount, and the '$TxP_{min}(dB)$' represents a physical minimum TX power on dB scale of the indoor BS.

$$\text{Max}TxP_k(dB) = \max(TxP_k(dB) - \text{PowerStep}, TxP_{min}(dB)) \quad \text{[Eqn. 11]}$$

In Equation 11, the 'Max$TxP_k(dB)$' represents a critical TX power of an indoor BS (k), the '$TxP_k(dB)$' represents a TX power on dB scale of the indoor BS (k), the 'PowerStep' represents a basic unit amount of a TX power increase/decrease, and the '$TxP_{min}(dB)$' represents a physical minimum TX power on dB scale of the indoor BS.

3) Load Balancing Procedure

Together with the above TX power control process of an indoor BS, when a plurality of indoor BSs operate within one building, a management server performs load balancing between the indoor BSs as follows.

In the above TX power control process, the indoor BS increases or decreases the TX power under the permission of the management server. When only one indoor BS exists within the building, the indoor BS gets permission for all its TX power increase and decrease requests. However, when a plurality of indoor BSs exist, some requests can be denied according to the load balancing result.

At a TX power increase or decrease request of an indoor BS, the management server determines the permission or non-permission for the request depending on the result of estimation of a load state of the indoor BS. Here, the estimation of the load state is carried out using an average load of indoor BSs and a load balancing factor. Here, load information of the indoor BS is provided from each indoor BS.

When there is a TX power increase request, the management server gives permission for a TX power increase, when Equation 12 below is met.

$$load_k \leq \frac{AvgLoad}{LBF} \qquad [Eqn. 12]$$

In Equation 12, the '$load_k$' represents a load of an indoor BS (k) requesting a TX power increase, the 'AvgLoad' represents an average load of indoor BSs, and the 'LBF' represents a load balancing factor. Here, the load balancing factor is less than or equal to '1'.

Also, when there is a TX power decrease request, the management server gives permission for a TX power decrease, when Equation 13 below is met.

$$load_k > AvgLoad \cdot LBF \qquad [Eqn. 13]$$

In Equation 13, the '$load_k$' represents a load of an indoor BS (k) requesting a TX power decrease, the 'AvgLoad' represents an average load of indoor BSs, and the 'LBF' represents a load balancing factor. Here, the load balancing factor is less than or equal to '1'.

Also, when there is no TX power increase or decrease request, the management server instructs a TX power decrease, when Equation 14 below is met.

$$load_k \geq \frac{AvgLoad}{LBF} \qquad [Eqn. 14]$$

In Equation 14, the '$load_k$' represents a load of an indoor BS (k) receiving instructions of a TX power decrease, the 'AvgLoad' represents an average load of indoor BSs, and the 'LBF' represents a load balancing factor. Here, the load balancing factor is less than or equal to '1'.

Also, when there is no TX power increase or decrease request, the management server instructs a TX power increase, when Equation 15 below is met.

$$load_k < AvgLoad \cdot LBF \qquad [Eqn. 15]$$

In Equation 15, the '$load_k$' represents a load of an indoor BS (k) receiving instructions of a TX power increase, the 'AvgLoad' represents an average load of indoor BSs, and the 'LBF' represents a load balancing factor. Here, the load balancing factor is less than or equal to '1'.

However, an indoor BS performing the 2) external interference restriction procedure is not subjected to the conditions of Equations 12 to 15 above. That is, regarding the indoor BS performing the 2) external interference restriction procedure, the management server gives permission for all TX power increase requests and TX power decrease requests. That is, the conditions of Equation 12 to 15 above are applied to an indoor BS performing the 1) coverage ensuring procedure, and an indoor BS completing the 2) external interference restriction procedure.

A description of an operation and construction of an indoor BS performing power control and a management server as above is made below with reference to the drawings.

Figure 3:
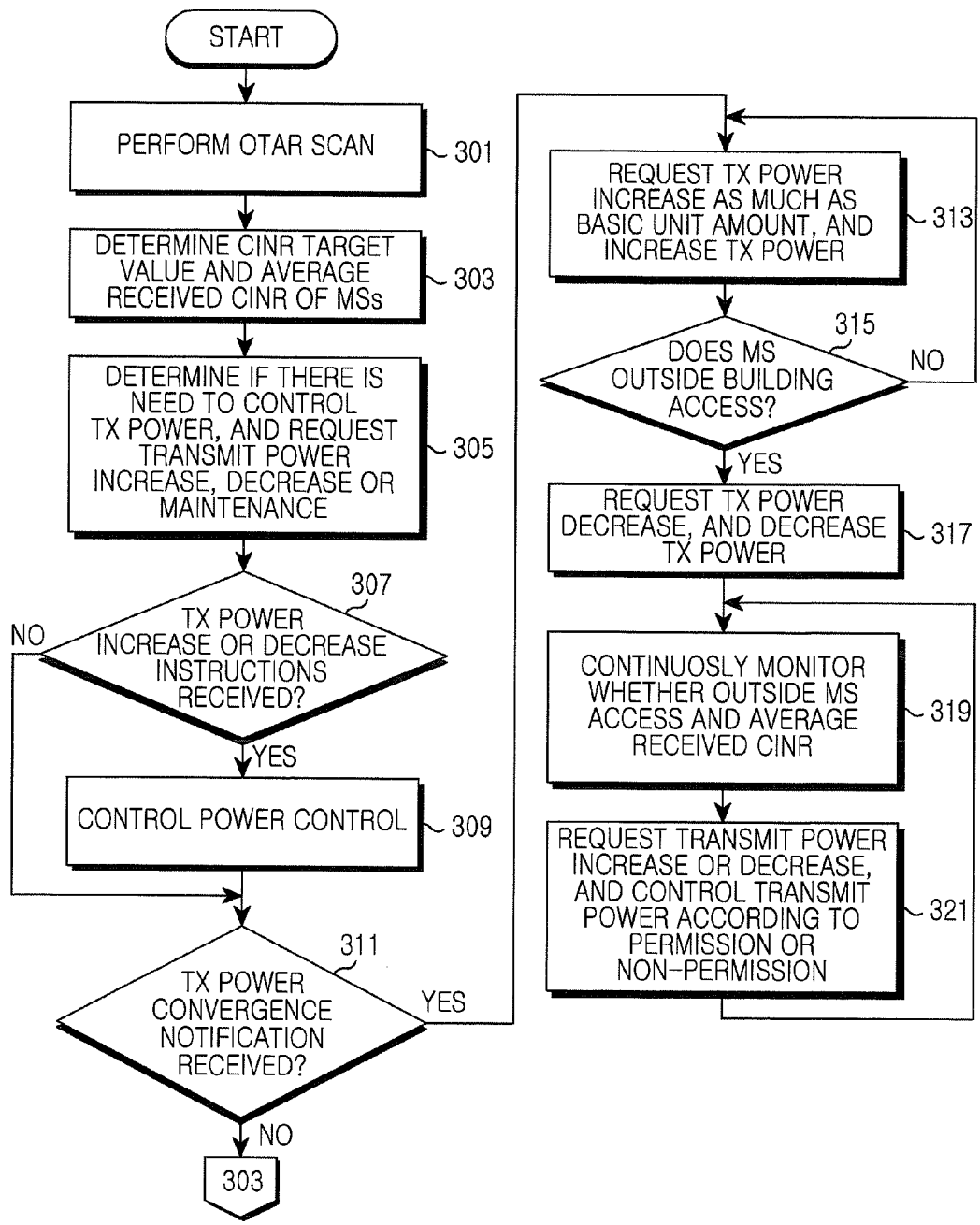
FIG. 3 illustrates an operation procedure of an indoor BS in a broadband wireless communication system according to an embodiment of the present invention.

FIG. 3 illustrates an operation procedure of an indoor BS in a broadband wireless communication system according to an embodiment of the present invention.

Referring to FIG. 3, in block 301, the indoor BS performs OTAR scan. The OTAR is the function of allowing the indoor BS to operate like an MS, thereby detecting signals of external BSs and, through this, acquiring identification (ID) information of the external BSs and information of a received signal strength for the external BSs, a noise power and the like. That is, the indoor BS acquires the ID information of the external BSs and the information of the received signal strength for the external BSs, the noise power and the like.

After that, the indoor BS proceeds to block 303 and determines a CINR target value and an average received CINR of MSs for the indoor BS. Here, the CINR target value represents a CINR at a cell boundary for ensuring the coverage of the indoor BS. A detailed process of determining the CINR target value and the average received CINR of the MSs for the external BSs is described below in detail with reference to FIG. 4.

Next, the indoor BS proceeds to block 305 and determines whether there is a need to control a TX power using the CINR target value and the average received CINR of the MSs for the indoor BS and then, according to the determination result, requests to increase, decrease or maintain a TX power to a management server. That is, when the average received CINR of the MSs for the indoor BS is less than the CINR target value, the indoor BS requests a TX power increase. Alternatively, when the average received CINR of the MSs for the indoor BS is greater than the CINR target value, the indoor BS requests a TX power decrease.

After the request to increase, decrease or maintain the TX power, the indoor BS proceeds to block 307 and determines whether a TX power increase or decrease instruction is received from the management server. If the TX power increase or decrease instruction is not received, the indoor BS determines that a TX power maintenance is instructed and then, jumps to block 311. However, an explicit TX power maintenance instruction can be used according to another embodiment of the present invention.

Alternatively, if the TX power increase or decrease instruction is received, the indoor BS proceeds to block 309 and increases or decreases a TX power according to the instruction. The increase or decrease amount of the TX power accords to a basic unit amount. However, when the TX power decrease instruction has been made but a current TX power is a minimum TX power or when the TX power increase instruction has been made but the current TX power is a maximum TX power, block 309 is omitted.

After that, the indoor BS proceeds to block 311 and determines whether it is notified from the management server that the TX power converges. That the TX power converges means that the coverage of the indoor BS is ensured. Convergence or non-convergence is determined by the management server when the TX power is maintained during a constant time. If it is notified that the TX power converges, the indoor BS returns to block 303.

Alternatively, if it is notified that the TX power converges, the indoor BS proceeds to block 313 and requests as much TX power increase as a basic unit amount, and increases the TX power according to the TX power increase instruction of the management server. That is, as the TX power converges, the indoor BS completes the 1) coverage ensuring procedure and enters the 2) external interference restriction procedure, and a TX power increase or decrease request in the 2) external interference restriction procedure is all given permission.

After increasing the TX power, the indoor BS proceeds to block 315 and determines whether an MS located outside a building has accessed the indoor BS. The access or non-access of the MS located outside the building is determined by selecting an object MS and determining whether the object MS is an outside MS using a received CINR of the object MS. A detailed process of determining the access or non-access of the MS located outside the building is described below with reference to FIG. 5. If the MS located outside the building has not accessed the indoor BS, the indoor BS returns to block 313 and increases the TX power as much as the basic unit amount.

Alternatively, when the MS located outside the building has accessed the indoor BS, in block 317, the indoor BS requests a TX power decrease, and decreases the TX power according to the TX power decrease request instructions of the management server. The decrease amount of the TX power is the smaller of twice a penetration loss and a difference between an average received CINR of MSs and a CINR target value. In other words, the decrease amount of the TX power is determined according to Equation 9 above. Block 317 is part of the 2) external interference restriction procedure, and a TX power increase or decrease request in the 2) external interference restriction procedure is all given permission. And, the 2) external interference restriction procedure is completed through the TX power decrease.

After that, the indoor BS proceeds to block 319 and continuously monitors whether the MS located outside the building access and the average received CINR of the MSs for the indoor BS. In other words, the indoor BS periodically carries out selection of an object MS and determination on the access or non-access of an outside MS using a received CINR of the object MS. And, the indoor BS periodically calculates the average received CINR of the MSs for the indoor BS, and compares the average received CINR with the CINR target value.

Next, in block 321, the indoor BS requests a TX power increase, decrease or maintenance according to the monitoring result of block 319, and controls the TX power according to an instruction of a management server. For example, when the outside MS has accessed the indoor BS, the indoor BS requests a TX power decrease. And, the indoor BS requests the TX power increase or decrease such that the average received CINR of the MSs for the indoor BS reaches the target CINR.

Figure 4:
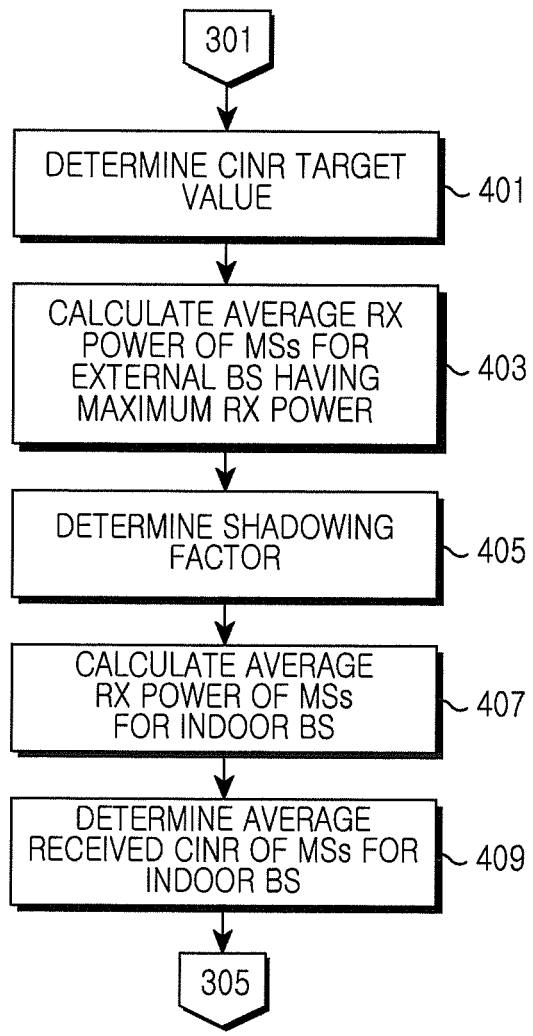
FIG. 4 illustrates a detailed operation procedure for determining a CINR target value and an average received CINR of Mobile Stations (MSs) during an operation of an indoor BS in a broadband wireless communication system according to an embodiment of the present invention.

FIG. 4 illustrates a detailed operation procedure of determining a CINR target value and an average received CINR of MSs during an operation of an indoor BS in a broadband wireless communication system according to an embodiment of the present invention.

Referring to FIG. 4, in block 401, the indoor BS determines a CINR target value. The CINR target value is a CINR at a boundary of coverage, and is determined using the larger of a CINR inducing a call drop and a received CINR of the indoor BS for an external BS having a maximum RX power as the OTAR scan result. For example, the indoor BS determines the CINR target value according to Equation 3 above.

After determining the CINR target value, the indoor BS proceeds to block 403 and calculates an average RX power of MSs for the external BS having the maximum RX power. Here, the external BS having the maximum RX power represents an external BS whose RX power toward the indoor BS is largest as the OTAR scan result of block 301. That is, the indoor BS identifies RX power values for the external BS having the maximum RX power, in RX power information by external BS periodically reported from MSs, and then calculates an average of the identified RX power values.

After that, the indoor BS proceeds to block 405 and determines a shadowing factor of the indoor BS using the average RX power of the MSs calculated in block 403. The shadowing factor is determined as a difference value between the RX power of the indoor BS for the external BS having the maximum RX power and the average RX power of the MSs. For example, the indoor BS determines the shadowing factor according to Equation 4 above.

After determining the shadowing factor, the indoor BS proceeds to block 407 and calculates an average RX power of the MSs for the indoor BS. The average RX power of each of the MSs is acquired through the report from the MSs. Accordingly, the indoor BS calculates an average of RX power reported from the MSs.

The indoor BS proceeds to block 409 and calculates an average received CINR of the MSs for the indoor BS using the average RX power of the MSs calculated in block 407. The average received CINR of the MSs for the indoor BS is calculated using the shadowing factor, the average RX power of the MSs for the indoor BS, a noise power, and a RX power of the indoor BS for external BSs. Here, the noise power and the RX power of the indoor BS for the external BSs are acquired through the OTAR scan. In detail, the indoor BS compensates the RX power for the external BSs for the shadowing factor, and calculates an interference and noise component by noise power summation, and calculates the average received CINR of the MSs by subtracting the noise and interference component from the average of the RX power reported by the MSs on dB scale. For example, the indoor BS calculates the average received CINR of the MSs for the indoor BS according to Equation 5 above.

Figure 5:
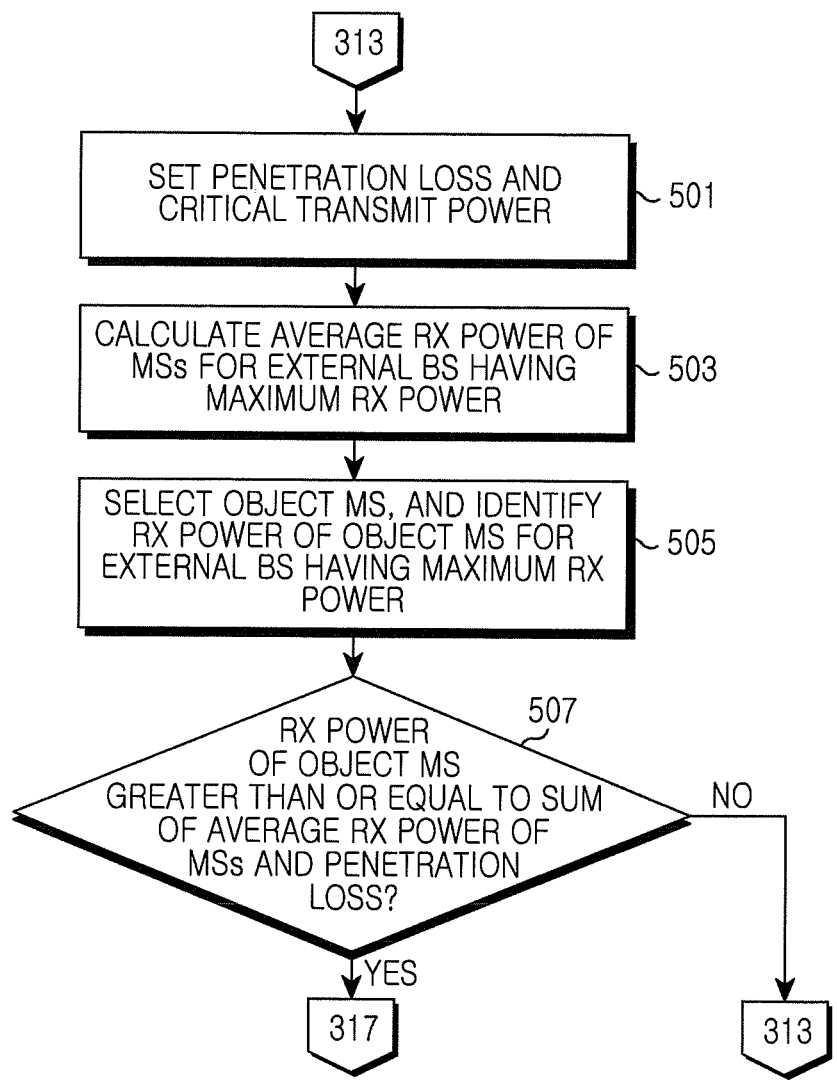
FIG. 5 illustrates a detailed operation procedure for determining the access or non-access of an outside MS during an operation of an indoor BS in a broadband wireless communication system according to an embodiment of the present invention.

FIG. 5 illustrates a detailed operation procedure of determining the access or non-access of an outside MS during an operation of an indoor BS in a broadband wireless communication system according to an embodiment of the present invention.

Referring to FIG. 5, in block 501, the indoor BS sets a penetration loss and a critical TX power. The penetration loss can be different by a concrete main cause of a form of a building, material of a building wall and the like. Accordingly, the indoor BS can use a penetration loss actually suitable to a building, or can use a predetermined penetration loss according to a typical pattern. The critical TX power is determined using information obtained during the operation of block 301. For example, the critical TX power can be set by a TX power obtained through block 317. However, when initializing the critical TX power before the execution of block 317, the critical TX power can be initialized to the maximum TX power that the indoor BS can physically output.

After setting the penetration loss and the critical TX power, the indoor BS proceeds to block 503 and calculates an average RX power of MSs for an external BS having a maximum RX power. Here, the external BS having the maximum RX power represents an external BS whose RX power toward the indoor BS is largest as the OTAR scan result of block 301. That is, the indoor BS identifies RX power values for the external BS having the maximum RX power, in RX power information by external BS periodically reported from MSs, and then calculates an average of the identified RX power values.

Next, in block 505, the indoor BS selects an object MS, and identifies a RX power of the object MS for the external BS having the maximum RX power. Here, the object MS is selected after excluding MSs neighboring on the indoor BS. For this, the indoor BS determines a threshold value greater by a constant amount than a CINR inducing a call drop, and selects the object MS from MSs having a received CINR below the threshold value. For example, the indoor BS selects the object MS among the MSs having the received CINR less than or equal to the sum of the CINR inducing the call drop and twice the penetration loss according to Equation 8 above. Here, the received CINR is a received CINR for the external BS. After selecting the object MS, the indoor BS identifies a RX power of the object MS for the external BS having the maximum RX power, in RX power information by external BS reported from the object MS.

After that, the indoor BS proceeds to block 507 and compares the RX power of the object MS for the external BS having the maximum RX power with the sum of the average RX power of the MSs accessing the indoor BS and the penetration loss. That is, the indoor BS determines whether Equation 7 above is met. If the RX power of the object MS is greater than or equal to the sum, the indoor BS determines that the object MS is located outside a building. Alternatively, if the RX power of the object MS is less than the sum, the indoor BS determines that the object MS is located inside the building.

Figure 6:
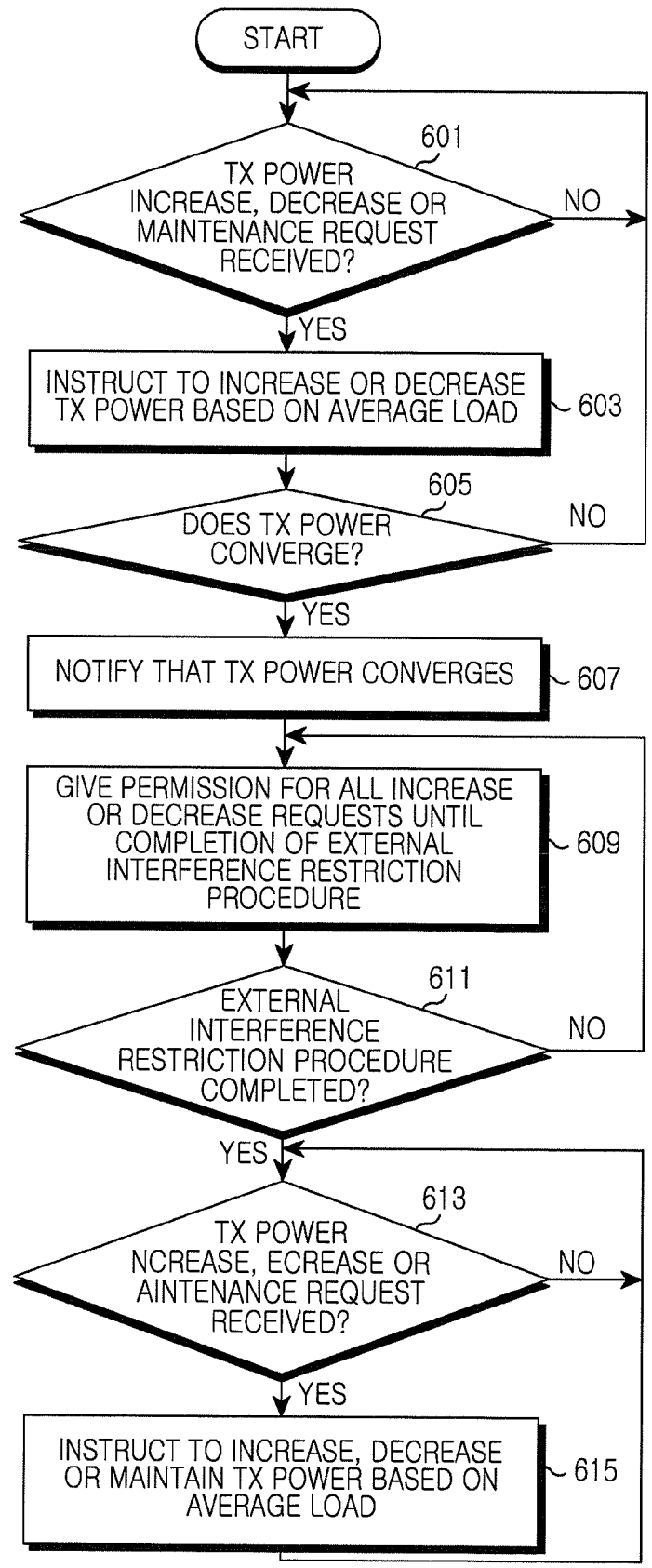
FIG. 6 illustrates an operation procedure for a management server in a broadband wireless communication system according to an embodiment of the present invention.

FIG. 6 illustrates an operation procedure of a management server in a broadband wireless communication system according to an embodiment of the present invention. FIG. 6 illustrates an operation procedure for one indoor BS. Accordingly, when there are a plurality of indoor BSs, the procedure of FIG. 6 can be carried out independently for each indoor BS.

Referring to FIG. 6, in block 601, the management server identifies if a TX power increase, decrease or maintenance is requested from an indoor BS. Here, the TX power increase, decrease or maintenance request can be received by periods, or can be received at a time the indoor BS determines the TX power increase, decrease or maintenance.

If the TX power increase, decrease or maintenance is requested, the management server proceeds to block 603 and determines the permission or non-permission for the TX power increase, decrease or maintenance request in consideration of an average load of indoor BSs installed within the same building and then, instructs a TX power increase or decrease. When intending to maintain a TX power, the management server can instruct implied maintenance by way of transmitting no instructions, or can transmit explicit maintenance instructions. A detailed process of determining the permission or non-permission for the TX power increase, decrease or maintenance request is described below with reference to FIG. 7.

Next, the management server proceeds to block 605 and determines whether the TX power of the indoor BS has converged. That the TX power converges means that the coverage of the indoor BS is ensured, that is, the 1) coverage ensuring procedure is completed. The convergence or non-convergence of the TX power is determined depending on whether the TX power is maintained during a constant time. If the TX power has not converged, the management server returns to block 601.

Alternatively, if the TX power has converged, the management server proceeds to block 607 and notifies the indoor BS that the TX power has converged. So, the 1) coverage ensuring procedure of the indoor BS is completed, and the indoor BS enters the 2) external interference restriction procedure.

After that, in block 609, the management server gives permission for all TX power increase or decrease requests of the indoor BS until completion of the 2) external interference restriction procedure. A TX power control request in the 2) external interference restriction procedure is achieved by way of a TX power increase request of at least one time and a TX power decrease request of at least one time after an increase request. Accordingly, after notifying that the TX power has converged, the management server gives permission for a continuous TX power increase request of at least one time from the indoor BS without considering an average load. After that, the management server gives permission for the TX power decrease request, if the TX power decrease request from the indoor BS is received.

Next, the management server proceeds to block 611 and determines whether the 2) external interference restriction procedure has been completed. That is, the management server identifies if a continuous TX power increase request of at least one time and a TX power decrease request of at least one time have been received from the indoor BS.

If the 2) external interference restriction procedure is completed, the management server proceeds to block 613 and identifies if the TX power increase, decrease or maintenance request is received from the indoor BS. Here, the TX power increase, decrease or maintenance request can be received by periods, or can be received at a time the indoor BS determines a TX power increase, decrease or maintenance.

If the TX power increase, decrease or maintenance is requested, the management server proceeds to block 615 and determines the permission or non-permission for the TX power increase, decrease or maintenance request in consideration of an average load of indoor BSs installed within the same building and then, instructs a TX power increase or decrease. When intending to maintain a TX power, the management server can instruct implied maintenance by transmitting no instructions or can instruct explicit maintenance by transmitting a control signal representing maintenance. A detailed process of determining the permission or non-permission for the TX power increase, decrease or maintenance request is described below with reference to FIG. 7. After that, the management server returns to block 613.

Figure 7:
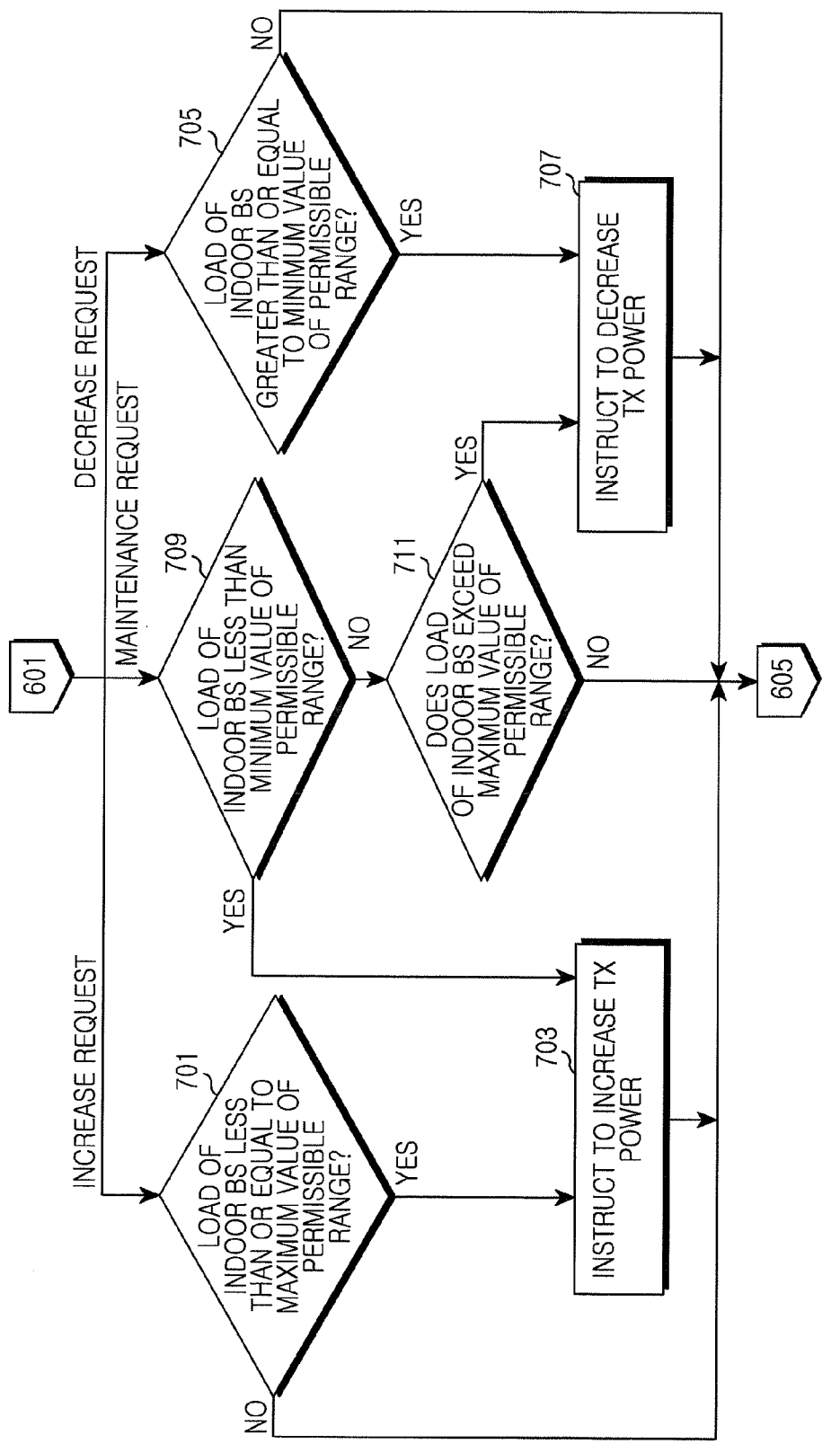
FIG. 7 illustrates a detailed operation procedure of Transmit power (TX power) control based on an average load during an operation of a management server in a broadband wireless communication system according to an embodiment of the present invention.

FIG. 7 illustrates a detailed operation procedure of TX power control based on an average load during an operation of a management server in a broadband wireless communication system according to an embodiment of the present invention. The procedure of FIG. 7 is a detailed operation procedure of blocks 603 and 615 of FIG. 6.

Referring to FIG. 7, if a TX power increase request is received in block 601, the management server proceeds to block 701 and, if a TX power decrease request is received, the management server proceeds to block 705 and, if a TX power maintenance request is received, the management server proceeds to block 709. In blocks 701, 705 and 709, the management server compares a load of an indoor BS with the maximum or minimum value of a permissible load range. Here, the load amount of the indoor BS is received together with a TX power control request, or is provided from the indoor BS through control signaling separate from the TX power control request. The permissible load range is determined using an average load of indoor BSs, which are installed within the same building as the indoor BS, and a load balancing factor. For example, the load balancing factor is a real number greater than '0' and less than or equal to '1', and the maximum value can be a multiplication of the average load and an inverse number of the load balancing factor, and the minimum value can be a multiplication of the average load and the load balancing factor.

The operation procedure of the management server is described below. For the TX power increase request, the management server proceeds to block 701 and determines whether the load amount of an indoor BS is less than or equal to the maximum value of a permissible load range. If the load amount of the indoor BS is less than or equal to the maximum value of the permissible load range, the management server proceeds to block 703 and instructs a TX power increase.

For the TX power decrease request, the management server proceeds to block 705 and determines whether the load amount of the indoor BS is greater than or equal to the minimum value of the permissible load range. If the load amount of the indoor BS is greater than or equal to the minimum value of the permissible load range, the management server proceeds to block 707 and instructs a TX power decrease.

For the TX power maintenance request, the management server proceeds to block 709 and determines whether the load amount of the indoor BS is less than the minimum value of the permissible load range. If the load amount of the indoor BS is less than the minimum value of the permissible load range, the management server proceeds to block 703 and instructs the TX power increase.

Alternatively, if the load amount of the indoor BS is greater than or equal to the minimum value of the permissible load range, the management server proceeds to block 711 and determines whether the load amount of the indoor BS exceeds the maximum value of the permissible load range. If the load amount of the indoor BS exceeds the maximum value of the permissible load range, the management server proceeds to block 707 and instructs the TX power decrease.

Also, when the load amount of the indoor BS exceeds the maximum value of the permissible load range in block 701, or when the load amount of the indoor BS is less than the minimum value of the permissible load range in block 705, or when the load amount of the indoor BS is less than or equal to the maximum value of the permissible load range in block 711, the management server instructs implied maintenance by transmitting no instructions. According to another embodiment of the present invention, the management server can instruct explicit maintenance by transmitting a control signal representing a TX power maintenance.

Figure 8:
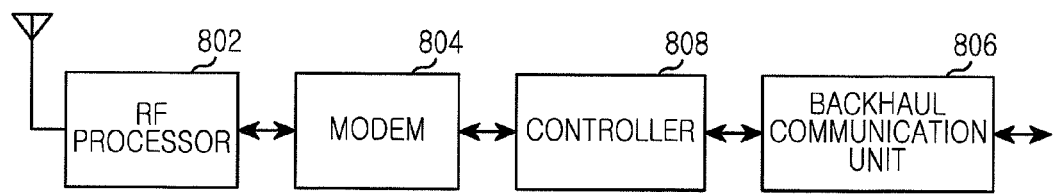
FIG. 8 illustrates a construction of an indoor BS in a broadband wireless communication system according to an embodiment of the present invention.

FIG. 8 is a block diagram illustrating a construction of an indoor BS in a broadband wireless communication system according to an embodiment of the present invention.

As illustrated in FIG. 8, the indoor BS includes a Radio Frequency (RF) processor 802, a modulator/demodulator (modem) 804, a backhaul communication unit 806, and a controller 808.

The RF processor 802 performs a function for transmitting/receiving signals with MSs through wireless channels, such as signal band conversion, amplification and the like. That is, the RF processor 802 up-converts a baseband signal provided from the modem 804 into an RF band signal and then transmits the signal through an antenna, and down-converts an RF band signal received through the antenna into a baseband signal.

The modem 804 performs a function of conversion between a baseband signal and a bit stream according to the physical layer standard of a system. For example, at data transmission, the modem 804 generates complex symbols by coding and modulating a transmit bit stream, maps the complex symbols to subcarriers, and configures Orthogonal Frequency Division Multiplexing (OFDM) symbols through Inverse Fast Fourier Transform (IFFT) operation and Cyclic Prefix (CP) insertion. Also, at data reception, the modem 804 splits, in the unit of an OFDM symbol, a baseband signal provided from the RF processor 802, restores signals mapped to subcarriers through Fast Fourier Transform (FFT) operation, and then restores a receive bit stream through demodulation and decoding. For example, the modem 804 restores a signal that includes RX power information reported from MSs, CINR information and the like, to data. Also, the modem 804 performs OTAR scan under the control of the controller 808 and, through this, acquires ID information of external BSs and information of a received signal strength for the external BSs, a noise power and the like.

The backhaul communication unit 806 provides an interface for the indoor BS to perform communication with other network entities such as a management server and the like. That is, the backhaul communication unit 806 converts a bit stream transmitted by the indoor BS into a physical signal, and converts a physical signal received by the indoor BS into a bit stream. For example, the backhaul communication unit 806 converts data, which includes a TX power increase, decrease or maintenance request, load information of the indoor BS and the like, into a physical signal, and transmits the signal to the management server. Also, the backhaul communication unit 806 converts a physical signal including a TX power increase, decrease or maintenance request and the like received from the management server, into data.

The controller 808 controls the general functions of the indoor BS. For instance, the controller 808 performs control corresponding to control information among receive data provided from the modem 804, and generates control information to be transmitted to MSs and a management server. Also, the controller 808 controls an OTAR function and, particularly, controls functions for determining a TX power of the indoor BS. An operation of the controller 808 for the TX power determination is described below.

Firstly, the controller 808 performs OTAR scan through the modem 804, thereby acquiring ID information of external BSs and information of a received signal strength for external BSs, a noise power and the like. After that, the controller 808 determines a CINR target value and an average received CINR of MSs for the indoor BS, determines whether there is a need to control a TX power using the CINR target value and the average received CINR of the MSs for the indoor BS, and requests to increase, decrease or maintain a TX power to a management server through the backhaul communication unit 806. After that, the controller 808 increases, decreases or maintains a TX power according to instructions from the management server received through the backhaul communication unit 806 and simultaneously, determines whether it is notified from the management server that the TX power converges. If it is notified that the TX power converges, the controller 808 repeatedly increases the TX power by as much as a basic unit amount until it is determined that an MS located outside a building has accessed the indoor BS. If it is determined that the MS located outside the building has accessed the indoor BS, the controller 808 stops increasing the TX power, and decreases the TX power such that the MS located outside the building cannot access. The decrease amount of the TX power becomes the smaller of twice a penetration loss or a difference between an average received CINR of MSs and a CINR target value. In other words, the decrease amount of the TX power is determined according to Equation 9 above. After that, the controller 808 continuously monitors whether the MS outside the building access and the average received CINR of the MSs for the indoor BS, requests a TX power increase, decrease or maintenance according to the monitoring result, and controls the TX power according to the instructions of the management server.

Among the above operation, an operation for determining the CINR target value and the average received CINR of the MSs is described below in detail. The controller 808 determines, as a CINR target value, the larger of a CINR inducing a call drop and a received CINR of the indoor BS for an external BS having a maximum RX power as the OTAR scan result. And, the controller 808 calculates an average RX power of MSs for an external BS having a maximum RX power as the OTAR scan result, and determines a shadowing factor of the indoor BS using the average RX power of the MSs. For example, the indoor BS determines the shadowing factor according to Equation 4 above. After that, the controller 808 calculates the average RX power of the MSs for the indoor BS, and calculates an average received CINR of MSs for the indoor BS using the average RX power of the MSs. The average received CINR of the MSs for the indoor BS is calculated using the shadowing factor, the average RX power of the MSs for the indoor BS, a noise power, and a RX power of the indoor BS for external BSs. That is, the controller 808 compensates, for the shadowing factor, the RX power for the external BSs, calculates an interference and noise component by noise power summation, and calculates the average received CINR of the MSs by subtracting the noise and interference component from the average of the RX power reported by the MSs on dB scale. For example, the controller 808 calculates the average received CINR of the MSs for the indoor BS according to Equation 5 above.

Among the above operation, an operation for determining the access or non-access of the outside MS is described below in detail. The controller 808 sets a penetration loss and a critical TX power. The controller 808 can use a penetration loss actually suitable to a building, or can use a predetermined penetration loss according to a typical type. And, the critical TX power is determined using information obtained during a TX power control process. For example, the critical TX power can be set to a TX power obtained through the 2) external interference restriction procedure. However, when initializing the critical TX power before completing the 2) external interference restriction procedure, the critical TX power can be initialized to the maximum TX power that the indoor BS can physically output. After setting the penetration loss and the critical TX power, the controller 808 calculates an average RX power of MSs for an external BS having a maximum RX power. And, the controller 808 selects an object MS, and identifies a RX power of the object MS for the external BS having the maximum RX power. The controller 808 determines a threshold value greater by a constant amount than a CINR inducing a call drop, and selects the object MS among MSs having a received CINR below the threshold value. For example, the threshold value can be the sum of the CINR inducing the call drop and twice a penetration loss. After that, the controller 808 compares the RX power of the object MS for the external BS having the maximum RX power with the sum of the average RX power of the MSs accessing the indoor BS and the penetration loss. If the RX power of the object MS is greater than or equal to the sum, the indoor BS determines that the object MS is located outside a building.

Figure 9:
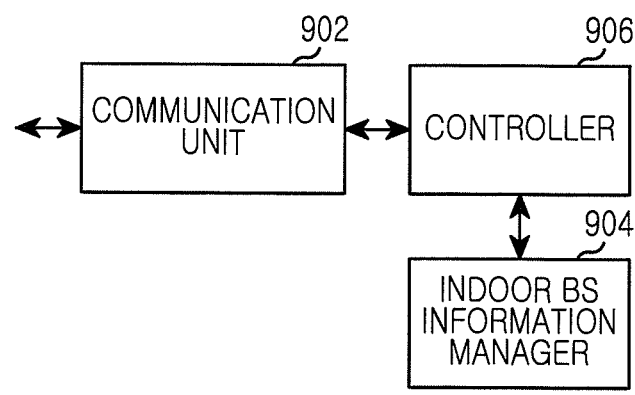
FIG. 9 illustrates a construction of a management server in a broadband wireless communication system according to an embodiment of the present invention.

FIG. 9 is a block diagram illustrating a construction of a management server in a broadband wireless communication system according to an embodiment of the present invention.

As illustrated in FIG. 9, the management server includes a communication unit 902, an indoor BS information manager 904, and a controller 906.

The communication unit 902 provides an interface for the management server to perform communication with other network entities such as an indoor BS and the like. That is, the communication unit 902 converts a bit stream transmitted by the management server, into a physical signal, and converts a physical signal received by the management server, into a bit stream. For example, the communication unit 902 converts, into data, a physical signal including a TX power increase, decrease or maintenance request received from the indoor BS, load information of the indoor BS and the like, and converts, into a physical signal, data including TX power increase, decrease or maintenance instructions and the like.

The indoor BS information manager 904 stores setting information and state information of indoor BSs that are under the control of the management server. For instance, the setting information includes a TX power, used Frequency Allocation (FA) and the like, and the state information includes a load amount and the like.

The controller 906 controls the general functions of the management server. For example, the controller 906 provides, to the indoor BS information manager 904, setting information and state information of an indoor BS among receive data provided from the modem 804, and generates control information to be transmitted to the indoor BS. In some embodiments, the controller 906 controls the functions for load balancing for indoor BSs. An operation of the controller 906 for load balancing is described below.

If a TX power increase, decrease or maintenance is requested from an indoor BS through the communication unit 902, the controller 906 determines the permission or non-permission for the TX power increase, decrease or maintenance request in consideration of an average load of indoor BSs installed within the same building and then, instructs a TX power increase or decrease. In order to determine the permission or non-permission for the TX power increase, decrease or maintenance request, the controller 906 compares a load of the indoor BS with the maximum value or minimum value of a permissible load range. In detail, when the TX power increase is requested, the controller 906 instructs the TX power increase through the communication unit 902, if the load amount of the indoor BS is less than or equal to the maximum value of the permissible load range. Or, when the TX power decrease is requested, if the load amount of the indoor BS is greater than or equal to the minimum value of the permissible load range, the controller 906 instructs the TX power decrease through the communication unit 902. Also, when the TX power maintenance is requested, if the load amount of the indoor BS is less than the minimum value of the permissible load range, the controller 906 instructs the TX power increase and, if the load amount of the indoor BS exceeds the maximum value of the permissible load range, instructs the TX power decrease. And, for situations other than those described above, the controller 906 instructs the TX power maintenance through the communication unit 902. The controller 906 can instruct implied maintenance by transmitting no instructions, or can instruct explicit maintenance by transmitting a control signal representing a TX power maintenance.

The above determination on the TX power increase, decrease or maintenance is applied during the 1) coverage ensuring procedure or after the completion of the 2) TX power restriction procedure. That is, during the 1) coverage ensuring procedure, the controller 906 determines a TX power increase, decrease or maintenance and simultaneously, determines whether a TX power of the indoor BS has converged. That the TX power converges represents that the coverage of the indoor BS is ensured, i.e., the 1) coverage ensuring procedure is completed. The convergence or non-convergence of the TX power is determined depending on whether a TX power is maintained during a constant time. If the TX power converges, the controller 906 notifies the indoor BS that the TX power converges. And, the controller 906 gives permission for all TX power increase or decrease requests of the indoor BS until the completion of the 2) external interference restriction procedure. After the 2) external interference restriction procedure is completed, if the TX power increase, decrease or maintenance request is received from the indoor BS, the controller 906 determines the permission or non-permission for the TX power increase, decrease or maintenance request in consideration of an average load of indoor BSs installed within the same building and then, instructs a TX power increase or decrease.

As described above, exemplary embodiments of the present invention can maximize the efficiency of an indoor BS by determining the TX power of the indoor BS in consideration of the capacity of the indoor BS and interference in the outside, in a broadband wireless communication system using an indoor BS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for determining the Transmit power (TX power) of an indoor Base Station (BS) in a wireless communication system, the method comprising:
    receiving received channel quality information associated with the indoor BS from at least one Mobile Station (MS);
    increasing in steps the TX power by as much as a basic unit amount and determining whether at least one MS located outside a building has accessed the indoor BS using the received channel quality information in every increase; and
    when at least one MS located outside the building has accessed the indoor BS, decreasing the TX power of the indoor BS.

2. The method of claim 1, wherein determining whether at least one MS located outside the building has accessed comprises:
    selecting at least one object MS; and
    determining whether the at least one object MS is located outside using a received channel quality of the object MS.

3. The method of claim 2, wherein selecting at the least one object MS comprises:
    determining a threshold value greater than a channel quality inducing a call drop; and
    selecting the at least one object MS among MSs having a received channel quality less than or equal to the threshold value.

4. The method of claim 3, wherein the threshold value comprises a sum of the channel quality inducing the call drop and twice an amount of a penetration loss.

5. The method of claim 2, wherein determining whether the at least one object MS is located outside comprises:
    determining that the object MS is located outside when a Receive power (RX power) of at least one object MS for an external BS having a maximum RX power is greater than or equal to the sum of an average RX power of the at least one MS for the external BS having the maximum RX power and a penetration loss.

6. The method of claim 1, wherein the decrease amount of the TX power is the smaller of: twice the amount of the penetration loss and a difference value between an average received channel quality of the at least one MS and a channel quality target value.

7. The method of claim 1, further comprising:
    acquiring RX power information on at least one external BS;
    determining a channel quality target value for at least one MS located inside a building to select the indoor BS as a serving BS, using the RX power information on the at least one external BS; and
    controlling the TX power such that an average channel quality of at least one MS within the coverage of the indoor BS reaches the channel quality target value.

8. The method of claim 7, wherein the channel quality target value is determined using a received channel quality for an external BS having a maximum RX power and a received channel quality inducing a call drop.

9. The method of claim 8, wherein the channel quality target value is determined according to the Equation below:

$$CINR_{coverage} = \max(CINR_{drop}, CINR_{MaxIndex}(\text{dB})) + \frac{A_{indoor}}{2 \cdot \ln(10)}$$

where, $CINR_{coverage}$ is the target value of channel quality;

$CINR_{drop}$ is the channel quality inducing call drop;

$CINR_{MaxIndex}(\text{dB})$ is the received channel quality on decibel (dB) scale of indoor BS for external BS having maximum RX power as Over The Air Receiver (OTAR) scan result; and $A_{indoor}$ is the attenuation coefficient of path loss model.

10. The method of claim 7, wherein controlling the TX power such that the average channel quality of the at least one MS reaches the channel quality target value comprises:
    calculating the average channel quality of the at least one MS;
    if the average channel quality of the at least one MS is less than the channel quality target value, increasing the TX power; and
    if the average channel quality of the at least one MS is greater than the channel quality target value, decreasing the TX power.

11. The method of claim 10, wherein calculating the average channel quality of the at least one MS comprises:
    determining a shadowing factor within the coverage of the indoor BS;
    compensating a RX power for the at least one external BS for the shadowing factor, and calculating an interference and noise component by noise power summation; and
    subtracting the noise and interference component from an average of at least one RX power reported by the at least one MS.

12. The method of claim 11, wherein determining the shadowing factor comprises calculating a difference value between a RX power of the indoor BS for an external BS having a maximum RX power and an average RX power of the at least one MS.

13. The method of claim 11, wherein the average channel quality of the at least one MS is determined according to the Equation below:

$$E[CINR_m(dB)] = E[RxP_{km}(dB)] - 10 \cdot \log\left(N + \sum_{i=1}^{I} RxP_{ik}/SF_k\right)$$

where, $E[CINR_m(dB)]$ is the average received channel quality on decibel (dB) scale for indoor BS encountered by MSs within coverage of indoor BS;

$E[RxP_{km}(dB)]$ is the average RX power on dB scale from indoor BS to MSs;

$RxP_{ik}$ is the RX power from external BS (i) to indoor BS (k); and $SF_k$ is the shadowing factor of indoor BS (k).

14. The method of claim 7, wherein controlling the TX power comprises:

requesting to increase, decrease or maintain a TX power to a management server; and increasing, decreasing or maintaining the TX power according to the instructions of the management server.

15. The method of claim 1, further comprising:

monitoring whether at least one MS located outside a building access and an average received channel quality of the at least one MS for the indoor BS; and increasing, decreasing or maintaining the TX power according to the monitoring result.

16. An operation method of a server managing an indoor Base Station (BS) in a wireless communication system, the method comprising:

when a Transmit power (TX power) increase, decrease or maintenance request is received from the indoor BS, determining a permission or non-permission for the TX power increase, decrease or maintenance request in consideration of an average load of at least one indoor BS installed within a building where the indoor BS is located; and instructing the indoor BS about a TX power increase, decrease or maintenance.

17. The method of claim 16, wherein determining the permission or non-permission for the TX power increase, decrease or maintenance request compares the load amount of the indoor BS with the maximum value or minimum value of a permissible load range.

18. The method of claim 17, wherein the maximum value is a multiplication of the average load and an inverse number of a load balancing factor, wherein the minimum value is a multiplication of the average load and the load balancing factor, and wherein the load balancing factor is a real number greater than '0' and less than or equal to '1'.

19. The method of claim 17, wherein determining the permission or non-permission for the TX power increase, decrease or maintenance request comprises:

for the TX power increase request, determining a TX power increase when the load amount of the indoor BS is less than or equal to the maximum value;

for the TX power decrease request, determining the TX power decrease when the load amount of the indoor BS is greater than or equal to the minimum value;

for the TX power maintenance request, determining the TX power increase when the load amount of the indoor BS is less than the minimum value; and for the TX power maintenance request, determining the TX power decrease when the load amount of the indoor BS exceeds the maximum value.

20. The method of claim 16, further comprising giving permission for the request, when the TX power increase, decrease or maintenance request is for an external interference restriction procedure of the indoor BS.

21. An apparatus for determining the Transmit power (TX power) of an indoor Base Station (BS) in a wireless communication system, the apparatus comprising:

a modem configured to receive received channel quality information associated with the indoor BS from at least one Mobile Station (MS); and a controller configured to increase in steps the TX power by as much as a basic unit amount and determine whether at least one MS located outside a building has accessed the indoor BS using the received channel quality information in every increase and, when at least one MS located outside the building has accessed the indoor BS, decrease the TX power of the indoor BS.

22. The apparatus of claim 21, wherein, to determine whether at least one MS located outside the building has accessed the indoor BS, the controller selects at least one object MS, and determines whether the at least one object MS is located outside using a received channel quality of the object MS.

23. The apparatus of claim 22, wherein, to select the at least one object MS, the controller determines a threshold value greater than a channel quality inducing a call drop, and selects the at least one object MS among MSs having a received channel quality less than or equal to the threshold value.

24. The apparatus of claim 23, wherein the threshold value comprises a sum of the channel quality inducing the call drop and twice an amount of a penetration loss.

25. The apparatus of claim 22, wherein the controller determines that the at least one object MS is located outside, when a Receive power (RX power) of the at least one object MS for an external BS having a maximum RX power is greater than or equal to the sum of an average RX power of the at least one MS for the external BS having the maximum RX power and a penetration loss.

26. The apparatus of claim 21, wherein the decrease amount of the TX power is the smaller of twice the amount of the penetration loss and a difference value between an average received channel quality of the at least one MS and a channel quality target value.

27. The apparatus of claim 21, wherein the modem acquires Receive power (RX power) information on at least one external BS, and wherein the controller determines a channel quality target value for at least one MS located inside a building to select the indoor BS as a serving BS, and controls the TX power such that an average channel quality of at least one MS within the coverage of the indoor BS reaches the channel quality target value.

28. The apparatus of claim 27, wherein the channel quality target value is determined using a received channel quality for an external BS having a maximum RX power and a received channel quality that induces a call drop.

29. The apparatus of claim 28, wherein the channel quality target value is determined according to the Equation below:

$$CINR_{coverage} = \max(CINR_{drop}, CINR_{MaxIndex}(dB)) + \frac{A_{indoor}}{2 \cdot \ln(10)}$$

where, $CINR_{coverage}$ is the target value of channel quality;

$CINR_{drop}$ is the channel quality inducing call drop;

$CINR_{MaxIndex}(dB)$ is the received channel quality on decibel (dB) scale of indoor BS for external BS having maximum RX power as Over The Air Receiver (OTAR) scan result; and $A_{indoor}$ is the attenuation coefficient of path loss model.

30. The apparatus of claim 27, wherein, after calculating the average channel quality of the at least one MS, the controller increases the TX power when the average channel quality of the at least one MS is less than the channel quality target value, and decreases the TX power when the average channel quality of the at least one MS is greater than the channel quality target value.

31. The apparatus of claim 30, wherein, to calculate the average channel quality of the at least one MS, the controller determines a shadowing factor within the coverage of the indoor BS, compensates a RX power for the at least one external BS for the shadowing factor, calculates an interference and noise component by noise power summation, and subtracts the noise and interference component from an average of at least one RX power reported by the at least one MS.

32. The apparatus of claim 31, wherein, to determine the shadowing factor, the controller calculates a difference value between a RX power of the indoor BS for an external BS having a maximum RX power and an average RX power of the at least one MS.

33. The apparatus of claim 31, wherein the average channel quality of the at least one MS is determined according to the Equation below:

$$E[CINR_m(dB)] = E[RxP_{km}(dB)] - 10 \cdot \log\left(N + \sum_{i=1}^{I} RxP_{ik}/SF_k\right)$$

where, $E[CINR_m(dB)]$ is the average received channel quality on decibel (dB) scale for indoor BS encountered by MSs within coverage of indoor BS;

$E[RxP_{km}(dB)]$ is the average RX power on dB scale from indoor BS to MSs;

$RxP_{ik}$ is the RX power from external BS (i) to indoor BS (k); and $SF_k$ is the shadowing factor of indoor BS (k).

34. The apparatus of claim 27, wherein, to control the TX power, the controller requests to increase, decrease or maintain a TX power to a management server, and increases, decreases or maintains the TX power according to the instructions of the management server.

35. The apparatus of claim 21, wherein the controller monitors whether at least one MS located outside a building access and an average received channel quality of the at least one MS for the indoor BS, and increases, decreases or maintains the TX power according to the monitoring result.

36. A server apparatus for managing an indoor Base Station (BS) in a wireless communication system, the apparatus comprising:

a manager configured to store load information on at least one indoor BS; and a controller configured to, when a Transmit power (TX power) increase, decrease or maintenance request is received from the indoor BS, determine the permission or non-permission for the TX power increase, decrease or maintenance request in consideration of an average load of at least one indoor BS installed within a building where the indoor BS is located, and to instruct the indoor BS about a TX power increase, decrease or maintenance.

37. The apparatus of claim 36, wherein, to determine the permission or non-permission for the TX power increase, decrease or maintenance request, the controller compares the load amount of the indoor BS with the maximum value or minimum value of a permissible load range.

38. The apparatus of claim 37, wherein the maximum value is a multiplication of the average load and an inverse number of a load balancing factor, wherein the minimum value is a multiplication of the average load and the load balancing factor, and wherein the load balancing factor is a real number greater than '0' and less than or equal to '1'.

39. The apparatus of claim 37, wherein, for the TX power increase request, when the load amount of the indoor BS is less than or equal to the maximum value, the controller determines a TX power increase and, for the TX power decrease request, when the load amount of the indoor BS is greater than or equal to the minimum value, determines the TX power decrease and, for the TX power maintenance request, when the load amount of the indoor BS is less than the minimum value, determines the TX power increase and, for the TX power maintenance request, when the load amount of the indoor BS exceeds the maximum value, determines the TX power decrease.

40. The apparatus of claim 36, wherein the controller gives permission for the request, when the TX power increase, decrease or maintenance request is for an external interference restriction procedure of the indoor BS.

* * * * *